(12) United States Patent
Sprenger et al.

(10) Patent No.: US 9,146,178 B2
(45) Date of Patent: Sep. 29, 2015

(54) TEST FACILITY FOR A VEHICLE EQUIPPED WITH AT LEAST ONE VEHICLE TIRE

(71) Applicant: Continental Reifen Deutschland GmbH, Hannover (DE)

(72) Inventors: Cord Sprenger, Hannover (DE); Klaus Asendorf, Hoya/Weser (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 14/286,817

(22) Filed: May 23, 2014

(65) Prior Publication Data

US 2014/0250997 A1 Sep. 11, 2014

Related U.S. Application Data

(63) Continuation of application No. PCT/EP2012/071783, filed on Nov. 5, 2012.

(30) Foreign Application Priority Data

Nov. 23, 2011 (DE) .......................... 10 2011 055 623

(51) Int. Cl.
*G01M 17/02* (2006.01)
*G01M 17/007* (2006.01)
*G01M 17/03* (2006.01)

(52) U.S. Cl.
CPC ............ *G01M 17/02* (2013.01); *G01M 17/007* (2013.01); *G01M 17/03* (2013.01)

(58) Field of Classification Search
None
See application file for complete search history.

(56) References Cited

U.S. PATENT DOCUMENTS

| | | | | |
|---|---|---|---|---|
| 4,455,866 | A * | 6/1984 | Barrigar | 73/116.07 |
| 4,993,258 | A * | 2/1991 | Pana et al. | 73/116.01 |
| 5,207,309 | A * | 5/1993 | Simpkin et al. | 198/341.09 |
| 6,609,409 | B1 * | 8/2003 | Bock et al. | 73/12.01 |
| 6,609,912 | B1 * | 8/2003 | Harashima et al. | 434/61 |
| 6,997,036 | B2 | 2/2006 | Kojima et al. | |
| 7,950,276 | B1 | 5/2011 | Freyhof | |
| 2002/0121144 | A1* | 9/2002 | Stein et al. | 73/862 |
| 2010/0192667 | A1* | 8/2010 | Friedman et al. | 73/12.06 |
| 2012/0260726 | A1* | 10/2012 | Cuttino | 73/146 |

(Continued)

FOREIGN PATENT DOCUMENTS

| | | | |
|---|---|---|---|
| DE | 10028099 | A1 * | 3/2001 |
| DE | 20 2005 006 771 | U1 | 12/2005 |
| EP | 0 860 693 | A1 | 8/1998 |
| JP | 61-251736 | A | 11/1986 |
| JP | 9-61307 | A | 3/1997 |

OTHER PUBLICATIONS

International Search Report dated Apr. 8, 2013 of international application PCT/EP2012/071783 on which this application is based.

(Continued)

*Primary Examiner* — Andre Allen
(74) *Attorney, Agent, or Firm* — Walter Ottesen P.A.

(57) ABSTRACT

A test facility for a vehicle having at least one tire includes an acceleration track; a test section; a return track; a guide defining a direction of travel; a slide configured to run on the guide and to guide the vehicle; a building defining an interior space; at least a part of the test facility being disposed in the interior space of the building; and, the test section being configured to be displaceable in at least one of a first direction transverse to the direction of travel and a second direction in the direction of travel.

23 Claims, 7 Drawing Sheets

(56) References Cited

U.S. PATENT DOCUMENTS

| | | | |
|---|---|---|---|
| 2012/0285229 A1* | 11/2012 | Sacher et al. | 73/118.01 |
| 2013/0055804 A1* | 3/2013 | Preising et al. | 73/116.01 |
| 2013/0068006 A1* | 3/2013 | Cuttino | 73/118.01 |
| 2015/0020586 A1* | 1/2015 | Kerestan et al. | 73/147 |

OTHER PUBLICATIONS

Translation of the Written Opinion of the International Searching Authority dated May 27, 2014 of international application PCT/EP2012/071783 on which this application is based.

\* cited by examiner

TEST FACILITY FOR A VEHICLE EQUIPPED WITH AT LEAST ONE VEHICLE TIRE

CROSS REFERENCE TO RELATED APPLICATIONS

This application is a continuation application of international patent application PCT/EP2012/071783, filed Nov. 5, 2012, designating the United States and claiming priority from German application 10 2011 055 623.0, filed Nov. 23, 2011, and the entire content of both applications is incorporated herein by reference.

FIELD OF THE INVENTION

The invention relates to a test facility for a vehicle having at least one vehicle tire.

BACKGROUND OF THE INVENTION

It is known to test vehicle components on test stands to determine, for example, the characteristics thereof and to improve the characteristics if required. However, the larger and bulkier these components are, the greater the cost required for the tests. Finally, before their production launch, motor vehicles are driven onto test tracks specifically designed for this purpose and, using large electronic measuring systems, are examined for their functionality and for potential weaknesses which may still be present. Due to their dimensions, such test tracks have hitherto not been accommodated inside a building. This has the disadvantage, however, that the entire test track is subjected to environmental conditions and is thus susceptible to damage so that tests carried out in succession are never able to be performed under identical conditions.

A particularity when testing vehicle tires is that the tires have to be tested for service life, material stability, running behavior and for their braking properties. As the tests are also carried out under extreme conditions, such as for example wet conditions, and with the application of salt or snow and ice, test stands which are located inside a building are primarily used for this purpose.

Such a rolling test stand is described in DE 20 2005 006 771 U1, for example. The rolling test stand permits the testing of vehicle components and thus also of vehicle tires on a rolling test stand, wherein the test stand is located in a building which is equipped with ventilation and climate technology. This has the advantage that in this case salt sprays are also able to be produced and weathering of the test components is possible. Also mentioned in the publication is the possibility of implementing the operating functions of a driver by a robot and/or by remote operation or remote control.

A slightly different test facility inside a building is described in JP 09061307 A, where air resistance tests may be tested on a rolling test stand directly on a mass-produced motor vehicle.

All these very advantageous possibilities, however, only permit the testing of a vehicle in an artificially produced system, resulting in a lack of realistic tests. To date, the properties of a vehicle tire can therefore only be tested to a limited extent and in an unsatisfactory manner under real, natural conditions, that is on the road surface and under environmental conditions, which is why, unfortunately, deviations between several successive test runs also have to be taken into account.

SUMMARY OF THE INVENTION

It is an object of the invention to provide a test facility which permits realistic tests both on vehicles and with vehicles as well as on the elements and systems thereof and which at the same time is able to be altered in a flexible manner and is designed to be simple in terms of construction.

A test facility for a vehicle equipped with at least one vehicle tire, including an acceleration track, a test section and a return track, wherein the vehicle is guided by a slide running on a guide, has been developed according to the invention so that at least one substantial part of the test facility is located inside a building and the test section is able to be displaced transversely to the direction of travel and/or longitudinally in the direction of travel of the vehicle.

The test facility of the invention is for a vehicle having at least one tire and includes: an acceleration track; a test section; a return track; a guide defining a direction of travel; a slide configured to run on the guide and to guide the vehicle; a building defining an interior space; at least a part of the test facility being disposed in the interior space of the building; and, the test section being configured to be displaceable in at least one of a first direction transverse to the direction of travel and a second direction in the direction of travel.

Via the solution according to the invention, it has been possible to carry out tests on vehicles both inside a building and under environmental conditions. In this case, there is no restriction as to whether individual components, systems or the entire vehicle are to be tested. As a result, the test facility according to the invention is able to be used in an extremely flexible manner and is therefore also suitable, in particular, for testing vehicle tires. By the guidance of the vehicle on a slide, very accurate track guidance is made possible so that the results are able to be reproduced in their entirety. This guidance additionally permits an automation of the entire test so that when using a complete vehicle, that is for example a passenger motor vehicle, no driver is required. In this case, both individual vehicle tires and a plurality of vehicle tires may be tested at the same time on the test section. Additionally, when using a complete vehicle, the properties of the vehicle tires may be tested on the specific vehicle, which provides significant advantages relative to previous test stand testing. The test facility makes possible to provide dry and wet road conditions in real circumstances, and road surfaces covered with ice and/or snow. The reproducibility of the test results and their quality could be significantly improved by the test facility according to the invention in comparison with previous testing. It is particularly advantageous here that tests may be carried out both indoors and outdoors. The displaceability of the test section additionally permits a high degree of flexibility.

A first embodiment of the invention is that the mobility of the test section not only relates to the test section as a whole but also to individual lanes of the test section which have different road surfaces and which lanes are able to be displaced transversely to the direction of travel and/or in the direction of travel of the vehicle. In this manner, for example, a lane may be used in order to test the vehicle inside the building while the vehicle travels subsequently on the same lane, for example with a longitudinal movement in the direction of travel of the vehicle into a section outside the building, so that here the test run may be continued under environmental conditions. The test facility thus results in considerable time saving when carrying out the tests.

Moreover, an embodiment of the invention provides that the entire test facility is located inside the building. In this variant, a test track is not provided outside the building in order to achieve real test results, which as far as possible are not influenced by environmental conditions, preferably on the complete vehicle. In this case, the climatic conditions may be accurately set and the parameters to be determined for the test may be very accurately identified. Although in this embodiment a building with large dimensions is required, the advantages of such a solution prevail.

An embodiment of the invention also provides that the inside of the building is air-conditioned. This measure contributes quite significantly to providing uniform test conditions which may also be reliably reproduced.

A test facility according to the invention is, however, also suitable for testing a vehicle tire repeatedly and in different ways, which is why the vehicle tire is also able to travel repeatedly over the entire test track. During this test phase, the vehicle tire is not removed from the vehicle. For this reason, a further proposal is to provide an assembly unit for preparing and transporting and/or removing the vehicle. This assembly unit may precede or be added to the actual test track. The construction of the vehicle and the preparation thereof for the test and/or follow-up work after the test is completed take place within the assembly unit.

A further particularity of the test facility set forth here is that the acceleration track, the test section and the return track form a track loop. Thus, during the operation of the test, the vehicles are able to circulate permanently and repeatedly travel over the same test track until the actual test is finished. In combination with the feature that the vehicle is guided on a slide, therefore, it is also understood that, in this case, the test results may be reproduced and carried out with uniform quality.

It is also advantageous if the test section includes a plurality of road surfaces, one of which is arranged in the region of the test track to be traveled on for each test drive. Due to the movability of the test section transversely to the direction of travel and/or longitudinally in the direction of travel of the vehicle, the road surfaces may be exchanged almost at will, without considerable costs being required therefor. The test section is simply pushed sufficiently far until it is located in the path of the vehicle tire to be tested. The vehicle with the vehicle tire to be tested may be guided in this manner once or repeatedly in succession over this road surface before the road surface is exchanged for another, which may be traveled on again without altering the test facility. By this measure, a continuous test run under the most varied conditions may also be carried out, providing considerable advantages in terms of time and cost. There is even the possibility that, without having to incorporate an intermediate stop, the vehicle circulates permanently and the test section is displaced in the process.

According to a simple variant of the design of the test section, the test section includes a depression into which several road surfaces which are able to be exchanged individually or together are incorporated parallel to one another. Thus, for example, there is the possibility of providing, in addition to the application of asphalt, gravel, chippings, sand, cobblestones or other road surfaces which in each case form a strip which is incorporated in the depression.

Plain bearings may also be used in order to facilitate the movability of the test section, in the manner of ball bearings or a pneumatic system producing an air cushion and/or a hydraulic system.

Moreover, there is the advantageous possibility of integrating cooling coils in the test section for producing a surface covered with ice or snow.

Moreover, the test section is able to be wetted and/or covered with snow using a sprinkler system.

All these possibilities and variants are intended to test a vehicle and/or a vehicle tire under all conceivable conditions of use and at the same time to achieve reliably reproducible results using the test facility according to the invention.

A further particularity of a test facility according to the invention is also that, instead of the curves generally prevalent on test tracks, turntables are used in this case at the turning points of the test track. In addition to these uses for the turntables, there is also the possibility of using a turntable in order to move the vehicle onto the test track or to remove the vehicle from the test track. As a result, in the last-mentioned variant, more turntables will be present than curves in the test track.

In order to improve further the reproducibility of the test results, it is also proposed that the vehicle is able to be controlled via a robot acting on the accelerator pedal or the brake pedal or by operating the on-board electronics. By replacing the "human" factor, the accuracy of the test results is markedly improved. Errors and delays in reaction time, which a driver of a vehicle would potentially cause, are thus able to be excluded.

It is also a particular advantage when a linear motor is used for accelerating the vehicle. This is constructed in a similar manner to the "transrapid principle" and receives the vehicle via a coupling in order to accelerate the vehicle subsequently. Moreover, in a manner known per se, cable systems or other drives may also be used, for example, without departing from the scope of the invention. The person skilled in the art will make a choice therefrom according to the circumstances and/or specifications.

According to a particularly simple variant of the invention, the guide is made of a circulating rail system. The vehicle is able to be driven without great effort on the rail system. Additionally, the rails may be laid out in any manner so that the test track is able to be of flexible design and altered at any time without great effort.

While the slide is permanently coupled to the vehicle and ensures its lateral guidance, according to a further advantageous embodiment of the invention, the slide is able to be coupled to a carriage for transporting the vehicle. The coupling between the carriage and the slide is released during the test run. After terminating the test, the carriage is driven forward and is thus able to drive back the vehicle into its initial position via the re-established coupling to the slide. A connection via electromagnets or a simple coupling such as a tow hitch or a bolt connection is possible, for example, as a coupling.

According to a further embodiment of the invention, an additional rolling structure is present for conditioning and/or for warming up the vehicle tires. This measure is only required under specific conditions as the vehicle tires may also be warmed up on the acceleration track.

A commercially available passenger motor vehicle or utility vehicle or commercially available motorcycle may be used as the vehicle.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
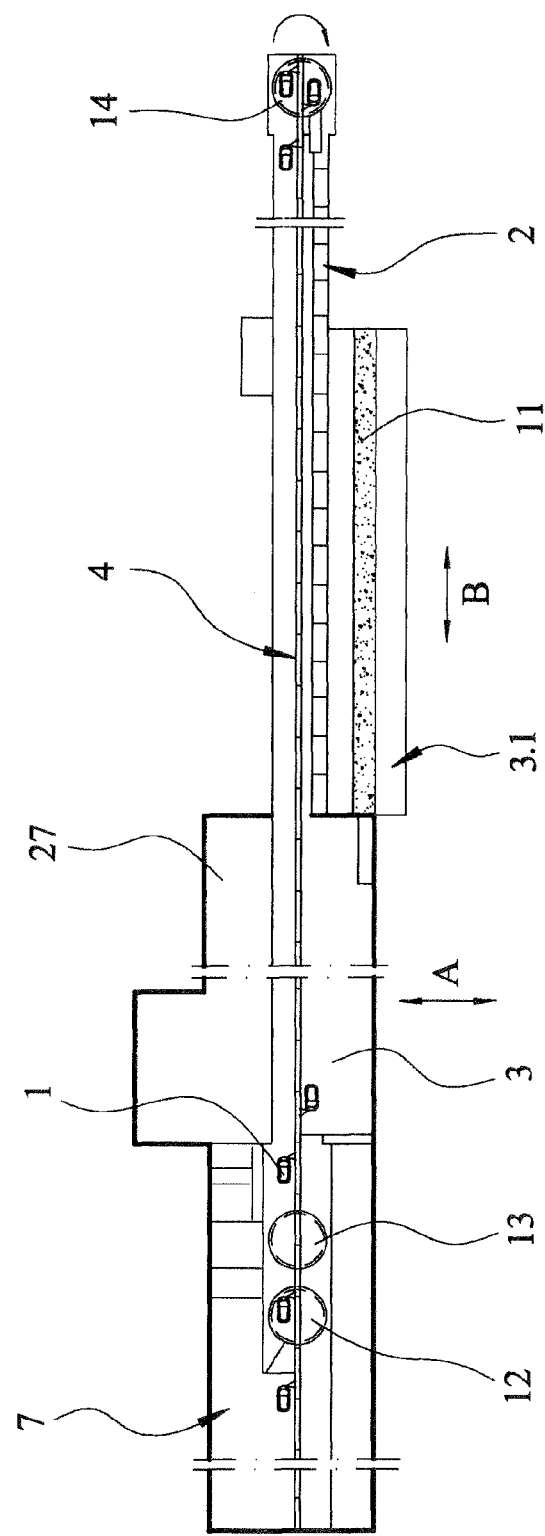
FIG. 1 shows a schematic view of a first embodiment of a test facility.

The view of a first embodiment of a test facility according to the invention, shown in FIG. 1, is made substantially of a building shown with thick lines, wherein, in this embodiment, an outside area is also present. The essential elements of the test facility are the test section 3, the return track 4 and the acceleration track 2. Overall, the test facility is configured as a track loop.

When carrying out a test, firstly a vehicle 1 is prepared for the test in the region of the assembly unit 7, which means that the vehicle 1 is equipped with the corresponding measuring instruments and control electronics. A vehicle 1 prepared in this manner is moved to the test track via the first turntable 12. The vehicle 1 may then be moved to the turntable 14 via the return track 4, turned there and subsequently brought to the speed required for the test on the acceleration track 2. At this speed, the vehicle 1 now travels over the test section 3 where the individual measurements and tests, that is for example braking tests, are carried out. After the test section 3, if required, the vehicle 1 is braked further and turned around by the turntable 13 so that it is then able to pass through a new test cycle. The return track 4 is in turn used for this purpose. If the test is to be terminated, however, there is the option of transporting the vehicle 1 via the turntable 12 to the assembly unit 7 and thus removing it from the test track.

A feature of the test facility according to the invention is that the test section 3 as a whole may be displaced in the direction of the arrow "A" and/or in the direction of the arrow "B". Moreover, there is the option to displace individual lanes with road surfaces (8, 9, 10, 11) arranged thereon, transversely to the direction of travel and/or longitudinally in the direction of travel of the vehicle 1.

In FIG. 1, for greater understanding, a part of the test section 3 is shown displaced longitudinally in the direction of travel of the vehicle 1, that is in the direction of the arrow "B". This test section 3.1 with the road surface 11 is located in this case outside the building. A further particularity of the example in FIG. 1 is that in this case an additional ice rink 27 forms a component of the test facility.

Figure 2:
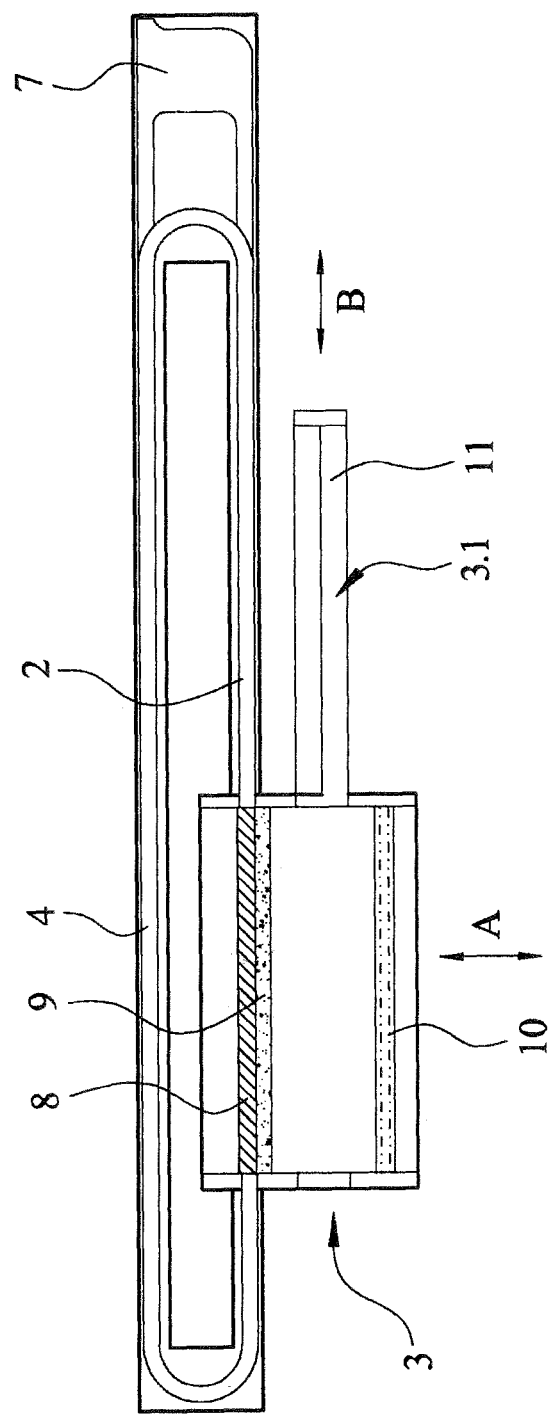
FIG. 2 shows a schematic view of a second embodiment of a test facility.

FIG. 2 shows a further embodiment of a test facility according to the invention. The test facility has, in the right-hand portion of FIG. 2, a mounting unit 7, via which vehicles 1 may be prepared or subjected to further work in the manner described above. A vehicle 1 prepared in the mounting unit 7 may subsequently be driven onto the test track which is configured in the shape of a loop. This test facility also includes an acceleration track 2, a test section 3 and a return track 4. In this case, however, no turntables are used for turning the vehicles around. Instead, the test facility includes conventional curves. The test section 3 has a plurality of road surfaces (8, 9, 10, 11), as in the example already described above, which may be of different types as indicated in FIG. 2. Thus it is equally possible to reproduce, for example, an asphalt surface 8, a gravel layer 9, a concrete surface 10 and a cobblestone surface 11 within the test section 3. The entire test section 3 may in this case be displaced in the direction of the arrow "A". Additionally there is the possibility of displacing individual lanes with a road surface 11 in the longitudinal direction of the test facility, that is longitudinally in the direction of travel of the vehicle 1 (direction of the arrow "B"). The configuration, shown in FIG. 2, of a test facility is provided as a test facility arranged entirely inside a building.

Figure 3:
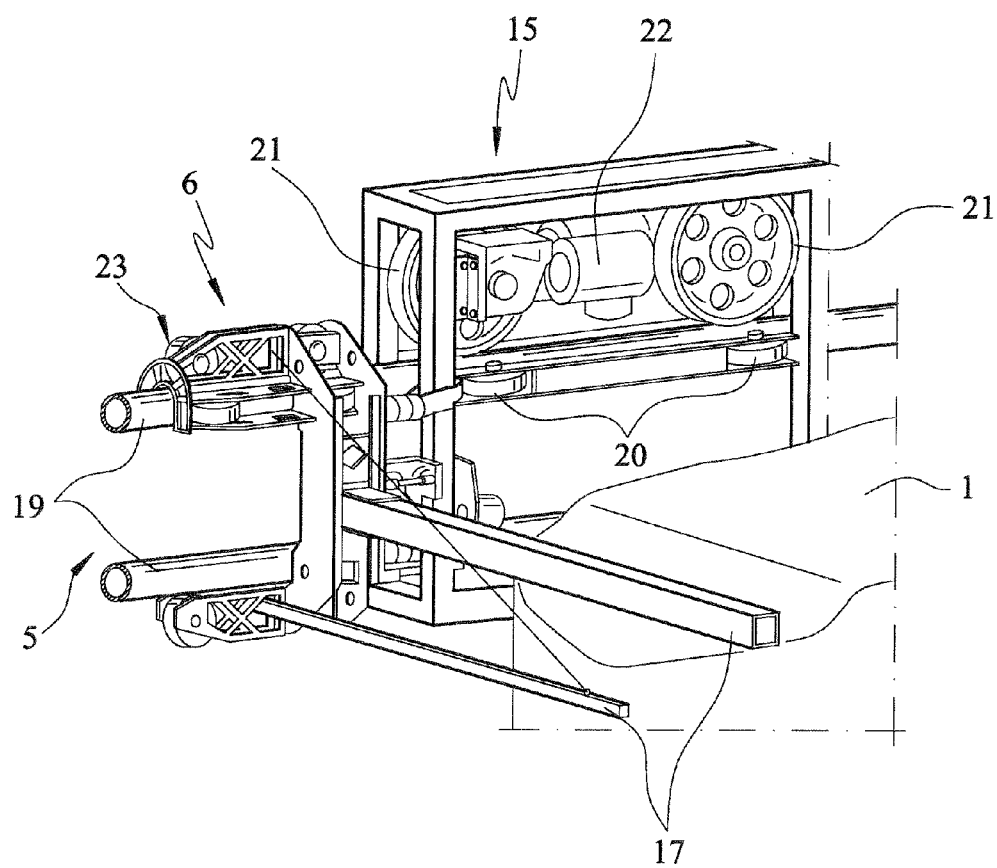
FIG. 3 shows a slide and a carriage for guiding the vehicle in a first embodiment.
Figure 4:
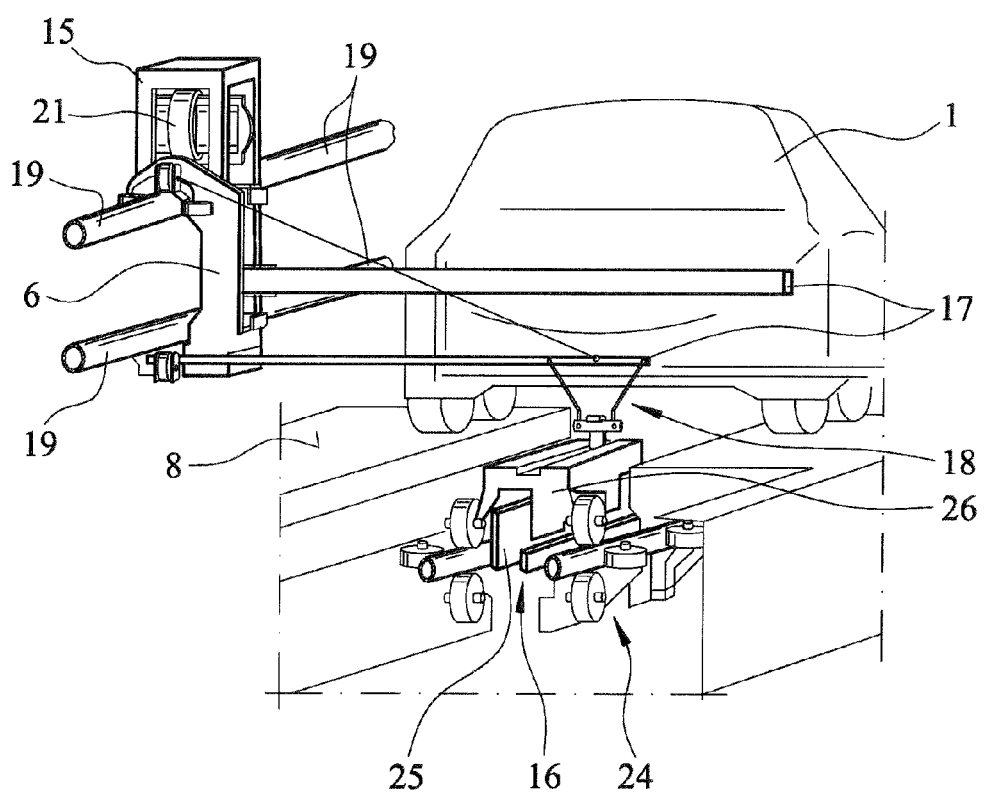
FIG. 4 shows the guidance of the vehicle with a linear motor as a drive for vehicle acceleration.

FIGS. 3 and 4 show the fastening of a vehicle 1 to the guide 5 of the test facility. As is shown in the drawings, the vehicle 1 is a complete vehicle, that is a passenger motor vehicle. Thus, real test conditions may be provided directly on the vehicle 1 via the test facility. The vehicle 1 is guided via a transverse guide rod system 17 which provides, in particular, lateral stability thereto. The transverse guide rod system 17 is a component of a slide 6 which is guided along the guide 5 formed by rails 19, via a wheel guidance system 23. The slide 6 is, moreover, periodically coupled to a carriage 15 which in turn has a separate drive. In the present case, an electric motor 22 serves as a drive for the carriage 15, wherein other types of drive are possible. The carriage 15 is also provided with running wheels 21 and guide wheels 20, so that it has a wheel guidance system as does the slide 6, which allows it to be driven under stable and uniform conditions along the guide 5. The function of the carriage 15 is to bring the vehicle 1 together with the slide 6 into a designated position at the beginning of the acceleration track 2. In this section, the carriage 15 is decoupled from the slide 6, so that the slide 6, with the vehicle 1 connected thereto, completes the further run of the test track. After completing the test, the carriage 15 is again moved toward the slide 6 and coupled to the slide 6 so that the vehicle 1 may be transported again.

The acceleration of the vehicle 1 required for test purposes is effected in this case by a linear motor 16. This is shown in FIG. 4. The linear motor 16, which is constructed according to the basic "transrapid" principle, includes a stator 25 of plate-shaped design, which is enclosed in a U-shape manner by a rotor designed as a rotor carrier 26, without any contact taking place. The rotor carrier 26 is also driven along rails, wherein a wheel guidance system 24 serves for the guidance, the construction thereof corresponding to the already described wheel guidance system of the carriage 15. The vehicle 1 is coupled to a fastening unit 18 of the rotor carrier 26 and thus may be accelerated by the linear motor 16. FIG. 4 also shows once again the connection of the vehicle 1 to the slide 6 and the carriage 15 which are both driven along the guide 5 defined by rails 19.

Figure 5A:
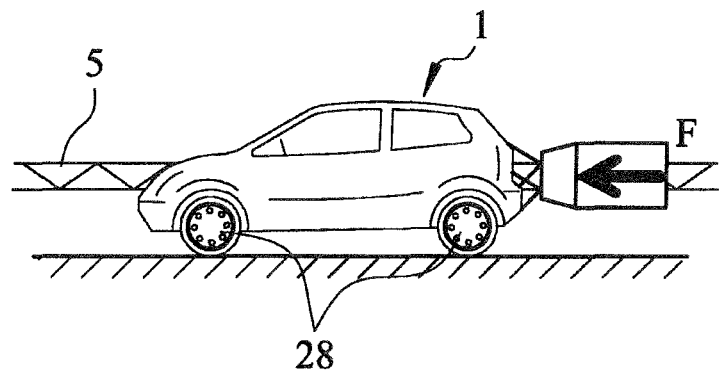
FIGS. 5A to 5C show, respectively, three different vehicles for use on the test facility.
Figure 5B:
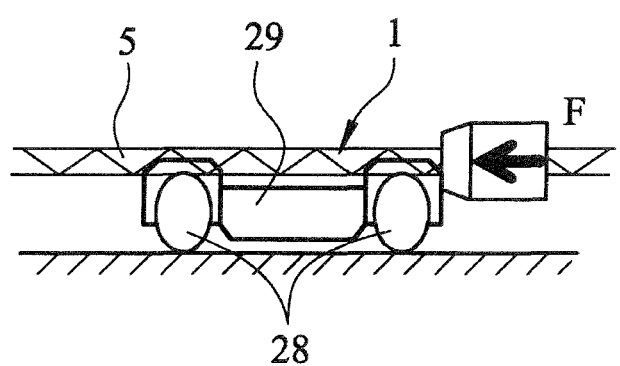
Figure 5C:
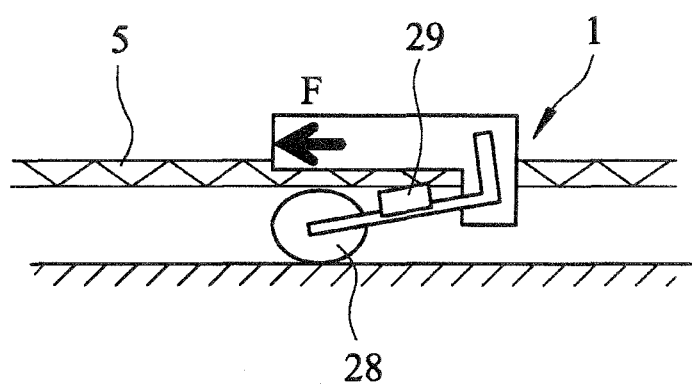

In FIGS. 5A to 5C, three different vehicles 1 are shown by way of example for use on the test facility.

FIG. 5A shows a complete, mass-produced passenger motor vehicle, so that in this case a test may be carried out under real vehicle conditions on the finished vehicle 1. A force acting on the vehicle 1 has only been shown symbolically by the arrow "F", the force being transmitted to the vehicle 1 by a drive motor or a further type of drive force.

The vehicle 1 in FIG. 5B, however, is a special test vehicle which in the present case may be adapted individually and, for example, may be equipped with weights 29 for adjusting the load of the vehicle wheels 28 to be tested. The vehicle wheels 28 are equipped in the conventional manner with vehicle tires. In the case of this vehicle 1 there is the possibility of using a vehicle 1 provided both with four vehicle wheels 28 and with two vehicle wheels 28.

Finally, a vehicle 1 is shown in FIG. 5C which may be used for testing a single vehicle wheel 28 and/or the vehicle tire mounted thereon. In the case of this vehicle 1, the drive is also implemented via a symbolically represented force "F" and there is the possibility of providing the vehicle 1 with weights 29.

Figure 6:
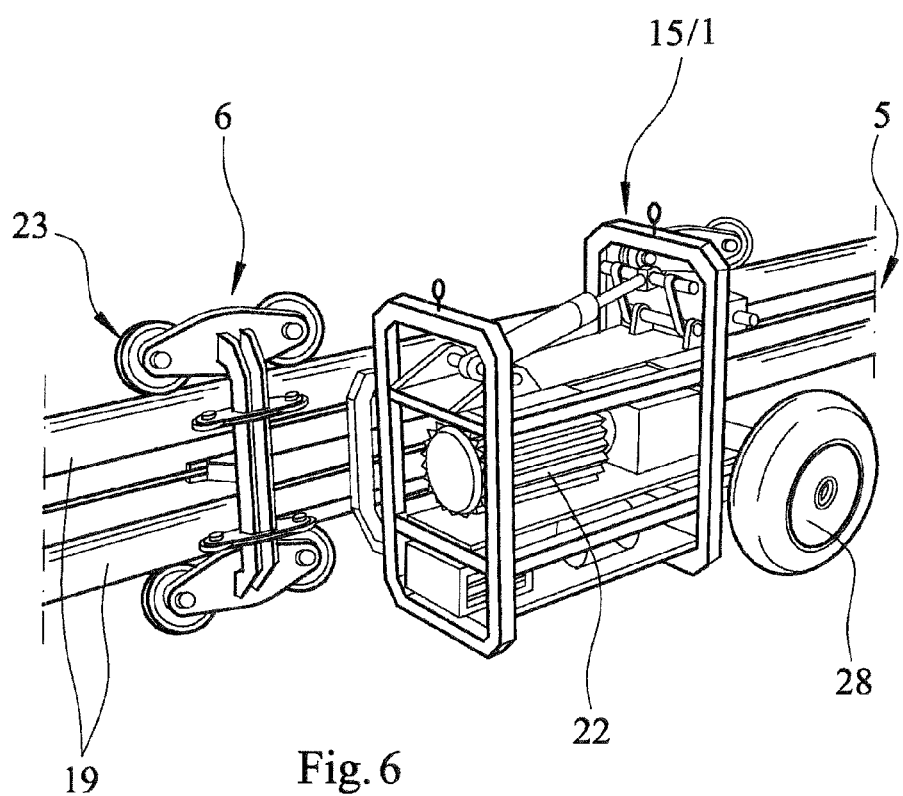
FIG. 6 shows a slide and a carriage for guiding the vehicle in a second embodiment; and, FIG. 7 shows a rough overview of a test sequence inside the test facility according to the invention.

The view in FIG. 6 shows, in detail, a vehicle 1 which is used for tests on just one vehicle wheel 28, more specifically, on the vehicle tire mounted thereon. The vehicle 1 in this case is made up of the carriage 15 already described initially and a slide 6 connected to the carriage 15. The slide 6 has a wheel guidance system 23 by which it is guided on the rails 19 of the guide 5. In the present case, an electric motor 22 serves as the drive, so that the carriage 15 in this case is used as a self-propelled test vehicle.

Figure 7:
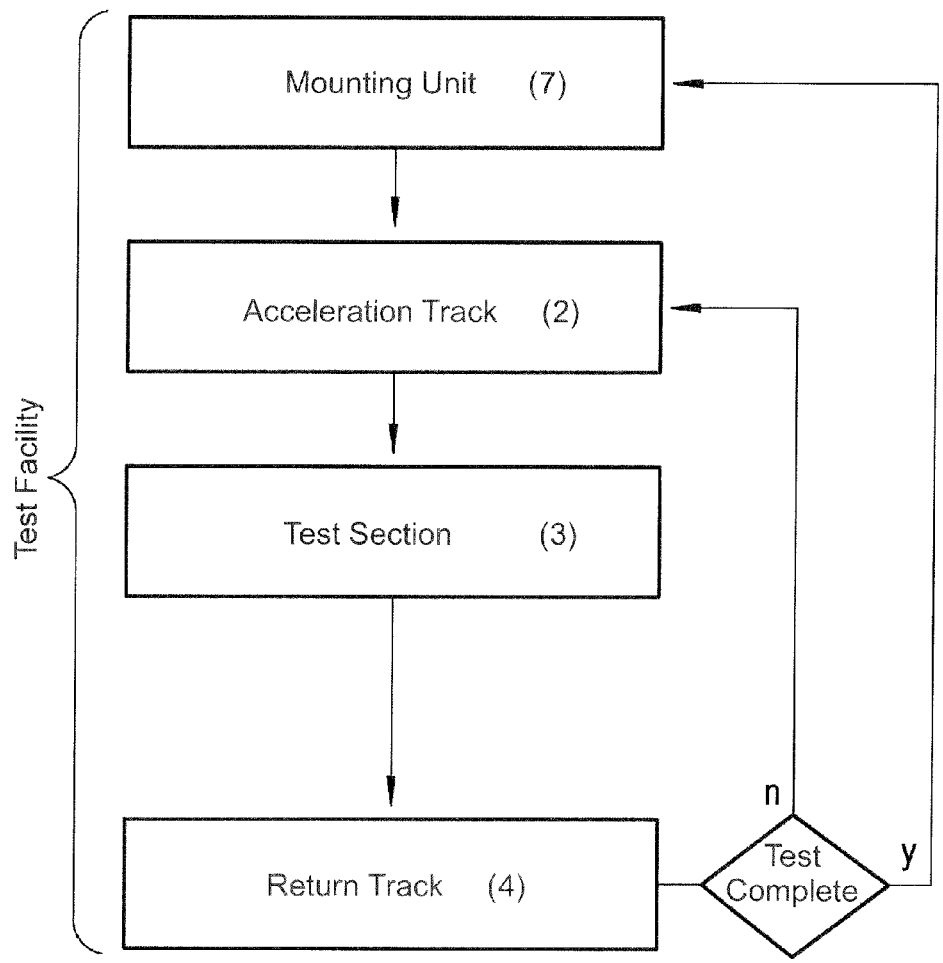

The sequence of a test method with a test facility according to the invention is shown in simplified form in FIG. 7. Firstly, the mounting of the vehicle 1 takes place in the mounting unit 7. Subsequently, the vehicle 1 is moved onto the acceleration track 2, and accelerated there, so as to pass subsequently through the test section 3, where the required tests are performed. After completing the test section 3 the vehicle 1 is driven back over the return track 4 in order to either be removed from the test track or to pass through a new test loop. This option has been shown in the drawing in FIGS. 5A to 5C by the rhombus-shaped box "test complete". This results in branching of the test sequence.

It is understood that the foregoing description is that of the preferred embodiments of the invention and that various changes and modifications may be made thereto without departing from the spirit and scope of the invention as defined in the appended claims.

LIST OF REFERENCE NUMERALS

1 Vehicle
2 Acceleration track
3 Test section
3.1 Test section outside
4 Return track
5 Guide
6 Slide
7 Assembly unit
8 Road surface
9 Road surface
10 Road surface
11 Road surface
12 Turntable
13 Turntable
14 Turntable
15 Carriage
16 Linear motor
17 Transverse guide rod system
18 Fastening unit
19 Rail
20 Guide wheels
21 Running wheels
22 Electric motor
23 Wheel guidance system
24 Wheel guidance system
25 Stator (plate-shaped)
26 Rotor carrier
27 Ice rink
28 Vehicle wheel
29 Weight

What is claimed is:

1. A test facility for a vehicle having at least one tire, the test facility comprising:
an acceleration track and a return track conjointly defining a test track;
a test section;
a guide defining a direction of travel;
a slide configured to run on said guide and to guide the vehicle;
a building defining an interior space;
at least a part of the test facility being disposed in said interior space of said building; and,
said test section being configured to be displaceable into said test track in at least one of a first direction transverse to said direction of travel and inside said building and a second direction in said direction of travel placing said test section outside of said building so as to cause said vehicle to pass over said test section thereby permitting tests and measurements to be made as the vehicle passes over said test section.

2. The test facility of claim 1, wherein:
said test section has a plurality of lanes with different road surfaces; and,
said lanes are configured to be individually displaceable in at least one of said first direction transverse to said direction of travel and said second direction along said direction of travel.

3. The test facility of claim 1, wherein all of said test facility is disposed in said interior space of said building.

4. The test facility of claim 1, wherein said interior space of said building is climate controlled.

5. The test facility of claim 1 further comprising a mounting unit configured to prepare, provide and remove said vehicle.

6. The test facility of claim 1, wherein said acceleration track, said test section and said return track form a driving loop.

7. The test facility of claim 1, wherein the test section has a plurality of road surfaces one of which is arranged in an area to be driven over by said vehicle for every test drive.

8. The test facility of claim 1, wherein:
said test section includes a trough having a plurality of road surfaces arranged therein; and,
said road surfaces are parallel to each other and are configured to be exchangeable individually or exchangeable as a group.

9. The test facility of claim 1, wherein said test section is displaceably mounted via at least one of ball bearings, plain bearings, an air cushion and a hydraulic arrangement.

10. The test facility of claim 1, wherein said test section includes cooling coils configured to generate at least one of an ice covered surface and a snow covered surface.

11. The test facility of claim 1 further comprising a sprinkler system configured to apply at least one of water and snow to said test section.

12. The test facility of claim 1, wherein the test facility defines at least two turning areas, the test facility further comprising:
at least two turntables each configured to form one of the two turning areas.

13. The test facility of claim 1 further comprising a robot configured to control the vehicle by actuating at least one of a brake pedal of the vehicle and an acceleration pedal of the vehicle.

14. The test facility of claim 1 further comprising a control configured to operate on-board electronics of the vehicle so as to control the vehicle.

15. The test facility of claim 1 further comprising at least one of a linear motor and a cable system configured to accelerate the vehicle.

16. The test facility of claim 1, wherein said guide is an annular rail system.

17. The test facility of claim 1 further comprising a carriage configured to be coupled to said slide for providing the vehicle.

18. The test facility of claim 1 further comprising a rolling structure configured to at least condition or warm up the tire of the vehicle.

19. The test facility of claim 1, wherein the vehicle is one of a passenger car, a commercial vehicle and a motorcycle.

20. A test facility for a vehicle having at least one tire, the test facility comprising:
   an acceleration track and a return track conjointly defining a test track;
   a test section;
   a guide defining a direction of travel;
   a slide configured to run on said guide and to guide the vehicle; and,
   said test section being configured to be displaceable into said test track in a direction transverse to said direction of travel so as to cause said vehicle to pass over said test section thereby permitting tests and measurements to be made as the vehicle passes over said test section.

21. The test facility of claim 20, wherein:
   said test section has a plurality of lanes with different road surfaces; and,
   said lanes are configured to be individually displaceable in said direction transverse to said direction of travel so as to place a selected one of said lanes in said test track.

22. The test facility of claim 21, further comprising a building defining an interior space; and, at least a part of the test facility being disposed in said interior space of said building.

23. The test facility of claim 22, wherein said test section is also displaceable in said direction of travel so as to place said test section outside of said building where said test section is subject to outdoor climate conditions.

* * * * *